(12) United States Patent
Zhang

(10) Patent No.: US 11,940,803 B2
(45) Date of Patent: Mar. 26, 2024

(54) METHOD, APPARATUS AND COMPUTER STORAGE MEDIUM FOR TRAINING TRAJECTORY PLANNING MODEL

(71) Applicant: BEIJING BAIDU NETCOM SCIENCE AND TECHNOLOGY CO., LTD., Beijing (CN)

(72) Inventor: Teng Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 341 days.

(21) Appl. No.: 17/216,208

(22) Filed: Mar. 29, 2021

(65) Prior Publication Data

US 2021/0216077 A1 Jul. 15, 2021

(30) Foreign Application Priority Data

Jun. 30, 2020 (CN) .......................... 202010623703.5

(51) Int. Cl.
G05D 1/02 (2020.01)
B60W 60/00 (2020.01)
(Continued)

(52) U.S. Cl.
CPC ......... *G05D 1/0221* (2013.01); *B60W 60/001* (2020.02); *G05D 1/0246* (2013.01);
(Continued)

(58) Field of Classification Search
CPC . G05D 1/0221; G05D 1/0246; B60W 60/001; B60W 2420/42; B60W 2554/20;
(Continued)

(56) References Cited

U.S. PATENT DOCUMENTS 10,007,269 B1 6/2018 Gray
11,227,187 B1 * 1/2022 Weinberger ........... G06T 7/0004
(Continued)

FOREIGN PATENT DOCUMENTS

CN 109117709 A 1/2019
JP 2017-159882 A 9/2017
(Continued)

OTHER PUBLICATIONS

Zeng et al., "End-To-End Interpretable Neural Motion Planner," 2019 IEEE/CVF Conference on Computer Vision and Pattern Recognition (10 pages).
(Continued)

*Primary Examiner* — Anne Marie Antonucci
*Assistant Examiner* — Patrick Daniel Mohl
(74) *Attorney, Agent, or Firm* — Knobbe, Martens, Olson & Bear, LLP

(57) ABSTRACT

A method for training a trajectory planning model, an apparatus, and computer storage medium are provided. The method may include: obtaining an image of a physical environment in which a vehicle is located via at least one sensor of the vehicle, the image including multiple objects surrounding the vehicle; obtaining a feature chart indicating multiple initial trajectory points of the vehicle in the image from a trajectory planning model based on the image; identifying the image to determine in the image a first area associated with a road object in multiple objects and a second area associated with a non-road object in the multiple objects; determining a planning trajectory point based on positional relationship of the multiple initial trajectory points with respect to the first area and the second area; and training a trajectory planning model based on the planning track point and the actual trajectory point of the vehicle.

18 Claims, 7 Drawing Sheets

(51) Int. Cl.
  *G05D 1/00* (2006.01)
  *G06N 5/04* (2023.01)
  *G06N 20/00* (2019.01)

(52) U.S. Cl.
  CPC ............... *G06N 5/04* (2013.01); *G06N 20/00* (2019.01); *B60W 2420/42* (2013.01); *B60W 2554/20* (2020.02); *B60W 2554/402* (2020.02); *B60W 2554/4029* (2020.02); *B60W 2555/60* (2020.02)

(58) Field of Classification Search
  CPC ... B60W 2554/402; B60W 2554/4029; B60W 2555/60; G06N 5/04; G06N 20/00; G06N 3/045; G06N 3/044; G06N 5/01; G06N 7/01; G06N 20/10; G06N 3/08; G06N 3/084; G01C 21/3407; G06V 20/56; G06F 18/24
  See application file for complete search history.

(56) References Cited

U.S. PATENT DOCUMENTS

| | | | |
|---|---|---|---|
| 2019/0034794 A1* | 1/2019 | Ogale | G06N 3/08 |
| 2019/0317519 A1 | 10/2019 | Chen | |
| 2019/0369616 A1 | 12/2019 | Ostafew | |
| 2019/0384303 A1 | 12/2019 | Muller et al. | |
| 2019/0384304 A1 | 12/2019 | Towal et al. | |
| 2020/0372265 A1* | 11/2020 | Ko | G06V 20/588 |
| 2020/0398894 A1* | 12/2020 | Hudecek | G05D 1/0214 |
| 2021/0342600 A1* | 11/2021 | Westmacott | G08G 1/056 |
| 2021/0358137 A1* | 11/2021 | Lee | G06T 7/246 |
| 2021/0405642 A1* | 12/2021 | Danford | G06V 20/588 |

FOREIGN PATENT DOCUMENTS

| | | |
|---|---|---|
| JP | 2019-008796 A | 1/2019 |
| JP | 2020-507137 A | 6/2019 |
| JP | 2019-530926 A | 2/2021 |
| WO | WO2019/188389 A1 | 3/2019 |
| WO | WO2019/178253 A1 | 9/2019 |

OTHER PUBLICATIONS

Extended European Search Report dated Sep. 20, 2021 for European Patent Application No. 21166377.8. 8 pages.

* cited by examiner

METHOD, APPARATUS AND COMPUTER STORAGE MEDIUM FOR TRAINING TRAJECTORY PLANNING MODEL

CROSS-REFERENCE TO RELATED APPLICATIONS

This application claims the priority of Chinese Patent Application No. 202010623703.5, titled "METHOD, APPARATUS AND COMPUTER STORAGE MEDIUM FOR TRAINING TRAJECTORY PLANNING MODEL", filed on Jun. 30, 2020, the content of which is incorporated herein by reference in its entirety.

TECHNICAL FIELD

Embodiments of the present disclosure relate to the field of autonomous driving, and more particularly, to a method, apparatus, and computer storage medium for training a trajectory planning model.

BACKGROUND

With the development of computers and the Internet, in low-speed automatic driving scenarios, more and more structures of neural networks have been utilized for planning cruise paths. Typically the neural networks is trained by inputting images thereto such that it may obtain accurate and reliable cruise paths. However, the input images include both road information related to the path planning, and interference information which is not related to the path planning, such as distant buildings, vehicles, and pedestrians. Due to a limited amount of computation of the neural network and a limited amount of data and network capacity, the interference information will increase the computation cost of the neural network and consume a large amount of resources.

SUMMARY

According to embodiments of the present disclosure, a scheme for a training trajectory planning model and determining a trajectory of a vehicle are provided.

In a first aspect of the present disclosure, a method of training a trajectory planning model is provided. The method includes obtaining an image of a physical environment in which the vehicle is located via at least one sensor of the vehicle, the image including a plurality of objects surrounding the vehicle; obtaining a feature chart indicating a plurality of initial trajectory points of the vehicle in the image by a trajectory planning model based on the image; identifying the image to determine a first area in the image associated with a road object in the plurality of objects and a second area in the image associated with a non-road object in the plurality of objects; determining a planning trajectory point based on a positional relationship of the plurality of initial trajectory points with respect to the first area and the second area; and training the trajectory planning model based on the planning trajectory point and the actual trajectory point of the vehicle.

In a second aspect of the present disclosure, a method of determining a trajectory of a vehicle is provided. The method includes obtaining an image of a physical environment in which the vehicle is located via at least one sensor of the vehicle; and determining a trajectory of the vehicle by a trajectory planning model based on the image, where the trajectory planning model is trained according to the method of the first aspect.

In a third aspect of the present disclosure, an apparatus for training a trajectory planning model is provided. The apparatus includes an image obtaining module configured to obtain an image of a physical environment in which the vehicle is located via at least one sensor of the vehicle, the image including a plurality of objects surrounding the vehicle; a feature chart determining module configured to obtain a feature chart by a trajectory planning model based on the image, the feature chart indicating a plurality of initial trajectory points of the vehicle in the image; an image identifying module configured to identify the image to determine a first area in the image associated with a road object in the plurality of objects and a second area in the image associated with a non-road object in the plurality of objects; a planning trajectory determining module configured to determine a planning trajectory point based on a positional relationship of the plurality of initial trajectory points with respect to the first area and the second area; and a trajectory planning training module configured to train the trajectory planning model based on the planning track points and the actual trajectory points of the vehicle.

In a fourth aspect of the present disclosure, an apparatus for determining a trajectory of a vehicle is provided. The apparatus includes an image determining module configured to obtain an image of a physical environment in which the vehicle is located via at least one sensor of the vehicle; and a trajectory determining module configured to determine a trajectory of the vehicle by the trajectory planning model based on the image, where the trajectory planning model is trained according to the apparatus of the third aspect.

In a fifth aspect of the present disclosure, there is provided an electronic device including one or more processors; and storage means for storing one or more programs, when executed by one or more processors, the one or more programs enable the one or more processors to implement the method according to the first aspect of the present disclosure.

In a sixth aspect of the present disclosure, there is provided an electronic device including one or more processors; and storage means for storing one or more programs, when executed by one or more processors, the one or more programs enable the one or more processors to implement the method according to the second aspect of the present disclosure.

In a seventh aspect of the present disclosure, there is provided a computer readable storage medium having a computer program stored thereon which, when executed by a processor, implements a method according to the first aspect of the present disclosure.

In an eighth aspect of the present disclosure, there is provided a computer readable storage medium having a computer program stored thereon which, when executed by a processor, implements a method according to the second aspect of the present disclosure.

It is to be understood that what is described in the Summary does not intend to limit the critical or important features of the embodiments of the disclosure, nor does it intend to limit the scope of the disclosure. Other features of the present disclosure will become readily apparent from the following description.

BRIEF DESCRIPTION OF THE DRAWINGS

The above and other features, advantages and aspects of the embodiments of the present disclosure will become more apparent from the following detailed description when taken in conjunction with the accompanying drawings. In the drawings, the same or similar figures denote the same or similar elements, where.

DETAILED DESCRIPTION OF EMBODIMENTS

Figure 1:
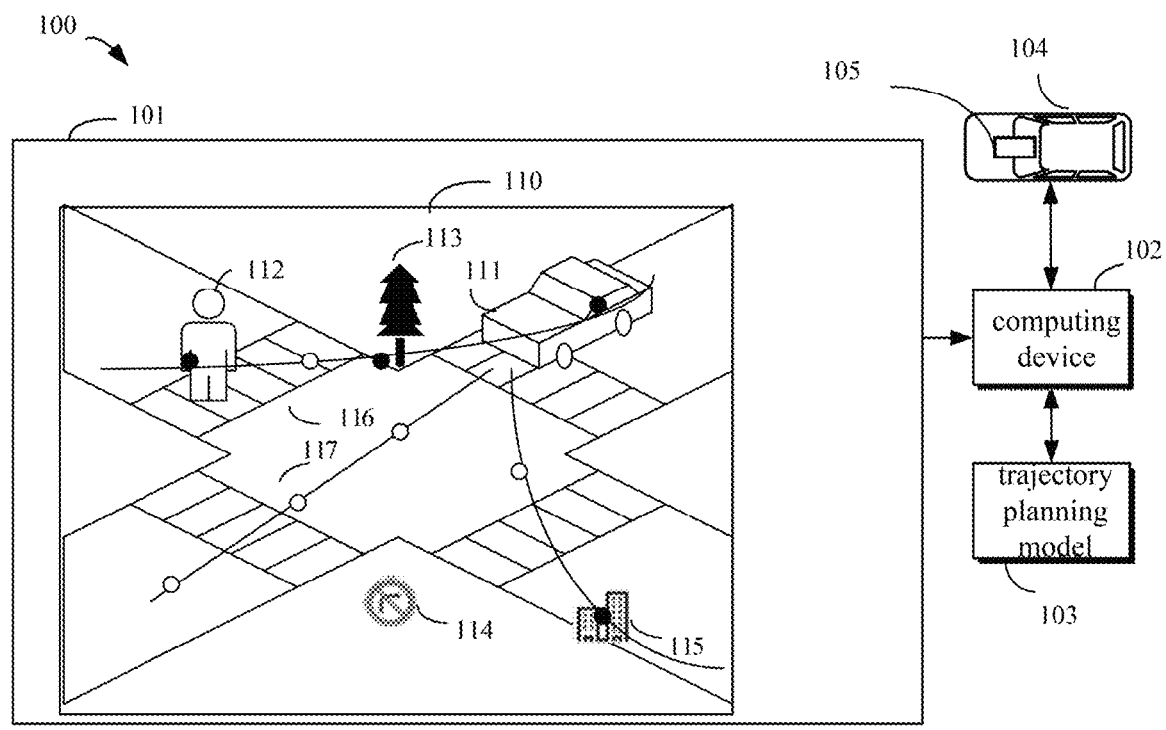
FIG. 1 illustrates a schematic diagram of an example environment in which various embodiments of the present disclosure can be implemented.

Embodiments of the present disclosure will be described in more detail below with reference to the accompanying drawings. While some embodiments of the disclosure are shown in the drawings, it is to be understood that the disclosure may be implemented in various forms and should not be limited to these embodiments set forth herein. Instead, these embodiments are provided so that this disclosure will be thorough and complete, and will fully convey the scope of this disclosure to those skilled in the art.

The term "includes/comprises" and variations thereof, as used herein, means open-ended, i.e., "including, but not limited to." Unless specifically stated, the term "or" means "and/or". The term "based on" means "based at least in part on." The terms "one exemplary embodiment" and "one embodiment" means "at least one exemplary embodiment." The term "another embodiment" means "at least one further embodiment." The terms "first," "second" and the like may refer to the same or different object. Other explicit and implicit definitions may also be included below.

In the description of embodiments of the present disclosure, the term "model" may learn from the training data an association between a corresponding input and an output, so that a given input is processed to generate a corresponding output based on the obtained parameter set after completion of the training. "model" may also be referred to as "neural network," "learning model," "learning network," or "network." These terms are used interchangeably herein.

As mentioned above, there are road information related to route planning in the input image, and also interference information that is not related to route planning in the input image, such as distant buildings, vehicles, and pedestrians or the like. Due to a limited amount of computation of the neural network and a limited amount of data and network capacity, this interference information may increase the computation cost of the neural network and consume a large amount of resources. Therefore, there is a need to find a low-cost, fast and efficient path planning training method to improve the accuracy of path planning.

According to embodiments of the present disclosure, a scheme of training a trajectory planning model is proposed. In this scheme, an image of the physical environment surrounding the vehicle is first obtained, including, for example, an object associated with a road (e.g., a driving lane) and an object associated with a non-road (other vehicles, pedestrians, surrounding scenery). Then, the above image is input to a trajectory planning model to be trained to obtain a high-level feature chart including initial trajectory points, and the same image is identified to determine an area associated with the road ("road area") and an area not associated with the road ("non-road area"). Then, the initial trajectory points in the high-level feature chart are compared with the road area and the non-road area to determine which initial trajectory point needs to be focused, so that the initially planned trajectory points are obtained. Finally, the preliminarily planned trajectory points are compared with the real trajectory, and the trajectory planning model is trained through continuous iterations of the above process.

By establishing the relationship between the initial trajectory points and the road area and the non-road area, it is possible to further determine the trajectory points to be focused on, thereby reducing the data processing amount, effectively reducing the learning difficulty of the trajectory planning network, improving the network convergence, and improving the stability of the trajectory planning result.

The basic principles and several example implementations of the present disclosure are described below with reference to the accompanying drawings.

FIG. 1 illustrates a schematic diagram of an example environment 100 in which various embodiments of the present disclosure may be implemented. It is to be understood that the environment 100 illustrated in FIG. 1 is merely an example and should not constitute any limitation on the functionality and scope of the implementations described in this disclosure. As shown in FIG. 1, the environment 100 includes a vehicle 104 driving on a road. In the example of FIG. 1, the vehicle 104 may be any type of vehicle that may carry people and/or objects and move through a power system such as an engine, including, but not limited to, a car, truck, bus, electric vehicle, motorcycle, RV, train, and the like. In some embodiments, one or more of the vehicles 104 in the environment 100 may be vehicles with certain autonomous driving capabilities, such vehicles being also referred to as unmanned vehicles. In some embodiments, the vehicle 104 may also be a vehicle that does not have an autopilot capability.

The vehicle 104 may be communicatively coupled to the computing device 102. Although shown as a separate entity, the computing device 102 may be embedded in the vehicle 104. The computing device 102 may also be an entity external to vehicle 104 and may communicate with the vehicle 104 via a wireless network. The computing device 102 may be any computing-capable device. As a non-limiting example, the computing device 102 may be any type of fixed computing device, mobile computing device, or portable computing device, including, but not limited to, a desktop computer, a laptop computer, a notebook computer, a tablet computer, a multimedia computer, a mobile phone, and the like; all or a portion of the components of the computing device 102 may be distributed over the cloud. The computing device 102 includes at least a processor, a memory, and other components typically present in a general purpose computer to perform functions like computing, storage, communication, control, etc.

The vehicle 104 also includes at least one sensor 105 configured to obtain an image 110 of the physical environment in which the vehicle 104 is located. For example, in the example of FIG. 1, the sensor 105 may be an image sensor that obtains an image 110 of the environment in which the vehicle 104 is located by computer vision techniques. In the example environment 100 of FIG. 1, the image 110 is a frame of the video 101. Although not shown, it should be understood that video 101 may also include other frames, and the image processing according to the present disclosure may be performed on the other frames. The image 110 may also be a still image taken by a camera. Merely as an example, in a scenario such as L3-level autopilot, the image 110 may be captured by one forward wide-angle camera and four fish eye cameras. The image 110 may also be obtained by any suitable means.

In the example environment 100, the image 110 is processed by the computing device 102. The computing device 102 may utilize image identification techniques (e.g., trained 2D identification models) to determine one or more objects in the image 110. The computing device 102 may also utilize the trajectory planning model 103 to determine the trajectory of the driving path of the vehicle 104. The trajectory planning model 103 includes any type of models capable of performing path trajectory planning. Depending on the particular path planning task, the configuration and training methods of the trajectory planning model 103 may be different. Some examples of the trajectory planning model 103 include, but are not limited to, a support vector machine (SVM) model, a Bayesian model, a random forest model, various deep learning/neural network models such as a convolutional neural network (CNN), a recurrent neural network (RNN), and the like. The trajectory planning model 103, while shown as a separate entity, may also be implemented in the computing device 102.

Figure 2:
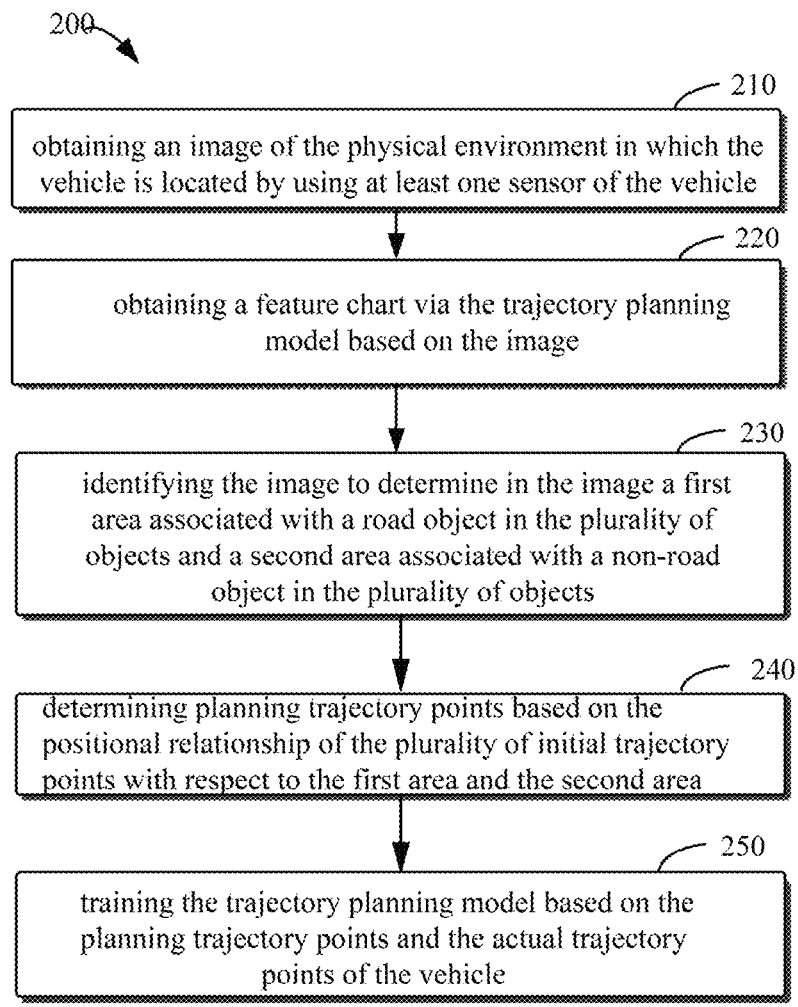
FIG. 2 illustrates a flow chart of a process of a training trajectory planning model according to some embodiments of the present disclosure.

Procedures for training the trajectory planning model and determining the trajectory of the vehicle are further described in details below in connection with FIGS. 2 to 5. FIG. 2 illustrates a flow diagram of a method 200 for training the trajectory planning model according to embodiments of the present disclosure. The method 200 may be implemented by the computing device 102 in FIG. 1. For ease of description, the method 200 will be described with reference to the example environment 100 of FIG. 1.

At block 210, the computing device 102 obtains the image 110 of the physical environment in which the vehicle 104 is located by using at least one sensor 105 of the vehicle 104. In some embodiments, the image 110 in front of the vehicle 104 may be obtained by using a camera mounted inside or outside the vehicle 104 when the vehicle 104 is driving to a certain position.

As shown in FIG. 1, the image 110 may reflect a road situation of an intersection in front of the vehicle 104, the image 110 includes objects 111-116 in which the object 111 is shown as a vehicle driving on the road, the object 112 is shown as a pedestrian crossing the road, the object 113 is shown as a tree on the road side, the object 114 is shown as a traffic sign, the object 115 is shown as a building at a distant position, and the object 116 is shown as marking lines on the road and the road. It should be understood that the number and type of the objects included in the image 110 shown in FIG. 1 are examples only and do not intend to be a limitation. The image 110 may include any number and type of objects.

In an alternative embodiment, the computing device 102 may communicate with one or more devices which are external to the vehicle 104 and associated with the physical environment in which vehicle 104 is located, to obtain the image 110. For example, the computing device 102 may communicate with a roadside camera around the location of the vehicle 104 to obtain the image 110. It will be appreciated that network technologies well known in the art (for example, cellular networks (e.g., the fifth generation (5G) network, Long Term Evolution (LTE) network, the third generation (3G) network, Code Division Multiple Access (CDMA) network, etc.), public land mobile network (PLMN), local area network (LAN), wide area network (WAN), metropolitan area network (MAN), telephone network (e.g., Public Switched Telephone Network (PSTN)), private network, ad hoc network, intranet, the Internet, fiber-optic-based network, etc., and/or combinations of these or other types of networks) may be employed to establish connections of the computing device 102, the vehicle 104 to roadside cameras, and will not be described in detail herein.

At block 220, the computing device 102 obtains a feature chart via the trajectory planning model 103 based on the image 110. In one example, the trajectory planning model 103 may be a convolutional neural network trained by a certain amount of data sets that may output initial trajectory points of the vehicle 104. For example, the forward wide-angle camera image of the vehicle 104 and the trajectory driving by the human driver may be recorded, then the trajectory may be projected onto each of the obtained image, and then input the image to the convolutional neural network for learning by the convolutional neural network. This is merely an example, and a feature chart may also be obtained from an untrained trajectory planning model 103 provided with initial parameters.

In one embodiment, the computing device 102 inputs the image 110 into the trajectory planning model 103, the image is subjected to convolution calculation, Full connection (FC) calculations, pooling calculations to obtain the feature chart. The feature chart may be a high level feature chart closest to the output result. As shown in FIG. 1, the feature chart includes a plurality of initial trajectory points 117 that constitute the driving path of the vehicle 104.

At block 230, the computing device 102 identifies the image to determine a first area in the image 110 associated with a road object in the plurality of objects and a second area in the image 110 associated with a non-road object in the plurality of objects. For example, the computing device 102 determines the vehicle 111, the pedestrian 112, the tree 113, the sign 114, the structure 115, the marking line on the road, and the road 116 therein by identifying the image 110. The objects 111-115 are non-road objects and the object 116 is a road object. The area associated with the object may be an area within the contour of the object, or may be a polygonal area formed by a peripheral tangent of an irregular contour of the object. The first area associated with the road object may be referred to as a driveable area, and the second area associated with a non-road object may be referred to as a non-driveable area.

In some embodiments, the computing device 102 obtains a depth chart based on the trained depth estimation network. The depth chart is also referred to as a distance chart, referring to an image that takes the distance from the sensor 105 to each point in the image 110 as a pixel value, i.e., each pixel value in the depth chart represents the distance between a certain point in the image 110 and the sensor 105 or the vehicle 104. Then, the computing device 102 determines the first area and the second area, that is, the driveable area and the non-driveable area, based on the distance. The depth estimation network may be a multi-view based depth estimation, a single-view based depth estimation, a binocular image based depth estimation, or a monocular image-based depth estimation, there is no limitation herein. In one example, the depth chart may be subjected to an image masking process to obtain a drivable area, the mask being a two-dimensional matrix array having a value of 1 corresponding to the first area and a value of 0 corresponding to the second area, the mask being multiplied by the image 110 to obtain the drivable area.

In an alternative embodiment, the computing device 102 may detect and directly classify objects in the image 110 based on a detection and classification device. The detection and classification device, for example, a multi-classifier or a binary classifier, may classify the detected object into any suitable category, e.g., may be classified as a human being, a vehicle, a plant, an identification, a road, etc. The computing device may then directly determine the drivable area and the non-drivable area by the above classification.

It should be noted that the determination of the driveable area and the non-driveable area may be made using the existing or future developed techniques, and this disclosure is not limited thereto.

At block 240, the computing device 102 determines planning trajectory points based on the positional relationship of the plurality of initial trajectory points 117 with respect to the first area and the second area. The computing device 102 first determines the positional relationship of the plurality of initial track points 117 with respect to the first area and the second area, and may then determine the planning trajectory points based on the positional relationship. This will be described in detail below in connection with FIG. 3.

In one embodiment, before determining the positional relationship of the plurality of initial trajectory points 117 with respect to the first area and the second area, the computing device 102 may perform a zoom out process on the identification chart including the first area and the second area, for example, the computing device 102 may determine a first predetermined format (e.g., a×b) of the identification chart and a second predetermined format (e.g., c×d) of the feature chart, and then the computing device may determine a ratio of the zoom out, for example, by calculating a ratio m of a to c and a ratio n of b to d. Finally, the computing device 102 may zoom out the identification chart in the first predetermined format to an identification chart in the second predetermined format using the zoom out ratios m and n.

By performing the zoom out processing on the identification chart before comparing the identification chart and the high-level feature chart, it is possible to further reduce the amount of data processing and make it easy to compare, thereby reducing the difficulty of training a trajectory planning model.

At block 250, the computing device 102 trains the trajectory planning model based on the planning trajectory points and the actual trajectory points of the vehicle 104. For example, the computing device 102 may obtain an actual driving trajectory multiple times from a sensor in the vehicle 104 and reconstruct the actual trajectory points of the vehicle 104 based on a three-dimensional point cloud image. The computing device 102 may then compare the planned trajectory points obtained at block 240 with the actual trajectory points to get errors therebetween. The computing device 102 then propagates the error in the opposite direction, i.e., the direction from the output layer to the input layer of the trajectory planning model 103. During such reverse propagation, the values of the parameters of the respective layers in the trajectory planning model 103 may be adjusted depending on the gradient descent algorithm. According to multiple rounds of training, the error between the planning trajectory point of the trajectory planning model 103 and the actual trajectory point becomes smaller and smaller until the model converges and the training process is completed.

In one embodiment, the computing device 102 may calculate the cross entropy loss L between the planning trajectory points and the actual trajectory points according to equation (1):

$$L = -\sum_{i=1,2,3\ldots N} y^{gt}\log y^p + (1-y^{gt})\log(1-y^p) \quad (1)$$

where i represents a sample, N represents the number of samples, $y^{gt}$ represents the actual trajectory points, and $y^p$ represents the planned trajectory points. The computing device may then perform the reverse propagation according to equation (2) to complete a training of the trajectory planning model 103:

$$\theta = \theta - \gamma \nabla_\theta L(f(\theta), y^{gt}) \quad (2)$$

where $\gamma$ represents hyperparametric learning rate, f represents the network structure of the trajectory planning model 103, $\theta$ represents the parameters to be learned, $y^{gt}$ represents the actual trajectory points, and L represents the cross entropy loss operation.

It should be appreciated that the training method in block 250 is an example. There may be any other network configuration and training method as desired in practical applications, and the embodiments of the present disclosure are not limited in this respect.

According to some embodiments of the present disclosure, based on the relationship between the planning trajectory points and the depth chart (the drivable area), the training of a trajectory planning task is guided with a result of depth estimation, to reduce learning difficulty, improve network convergence and generalization capabilities in a precondition of imposing limitations on the amount of training data and the network capacity, and improve the stability and success rate of trajectory planning for unmanned vehicles in low-speed learning scenarios.

Figure 3:
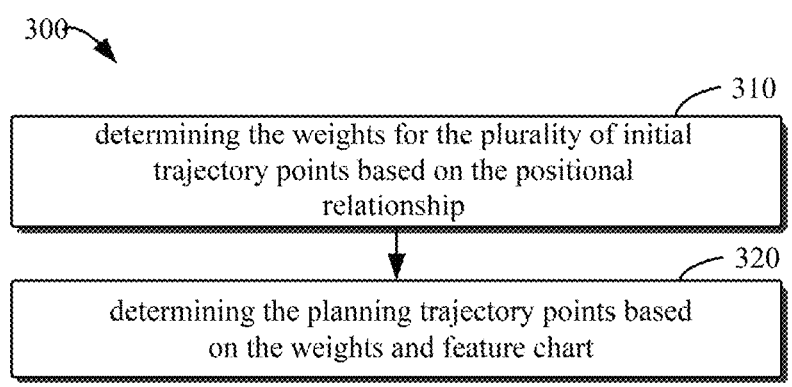
FIG. 3 illustrates a schematic diagram of determining planning trajectory points according to some embodiments of the present disclosure.

FIG. 3 illustrates a flow diagram of a method 300 of determining planning trajectory points according to embodiments of the present disclosure. As shown in FIG. 3, at block 310, the computing device 102 determines the weights for the plurality of initial trajectory points 117 based on the positional relationship. The computing device 102 first determines the positional relationship of the plurality of initial trajectory points 117 with respect to the first area and the second area. For example, the positional relationship may indicate that the plurality of initial track points 117 belong to the first area or the second area. For example, as shown in FIG. 1, the computing device 102 may determine that some of the plurality of initial track points 117 (indicated by hollow dots) fall into the road object 116, which belongs to the first area. The computing device 102 may determine that some of the plurality of initial track points 117 (indicated by solid dots) fall into the non-road objects 111-115, which belongs to the second area.

In one embodiment, the computing device 102 may determine a first matrix corresponding to the above identification chart that has been zoomed out and a second matrix corresponding to the high-level feature chart. Since the identification chart and the high-level feature chart have the same size, the first matrix and the second matrix have the same number of rows and columns. The computing device then compares the first matrix with the second matrix. If the elements in the first matrix corresponding to the elements in the second matrix is 1, it indicates that the point belongs to the first area (belonging to the drivable area), and if the point is 0, it belongs to the second area (not belonging to the drivable area).

The computing device 102 may then set a first set of initial trajectory points belonging to the first area (belonging to the drivable area) to have a first weight, and a second set of initial trajectory points belonging to the second area (belonging to the non-drivable area) to have a second weight, the first weight is greater than the second weight.

In one embodiment, the first weight is 1 and the second weight is 0.4. It should be understood that this particular weight value is merely an example and different weights may be set according to different neural network configurations and different learning scenarios, and the present disclosure does not intend to limit to the particular weights.

At block 320, the computing device 102 determines the planning trajectory points based on the weight and feature chart. For example. The computing device may point-multiply the matrix corresponding to the feature chart and the weight matrix, and then determine the planning trajectory points by a transposed convolution and sigmoid activation layer, where the planning trajectory points are similar to the plurality of initial trajectory points 117 in FIG. 1 and constitute the driving path of the traffic vehicle 104.

Embodiments of the present disclosure distinguish the non-road information and road information by setting different weights so that learn which information is path-related planning and which is irrelevant in the situation of limited training data and network capacity, and ultimately make a reasonable path planning.

Figure 4:
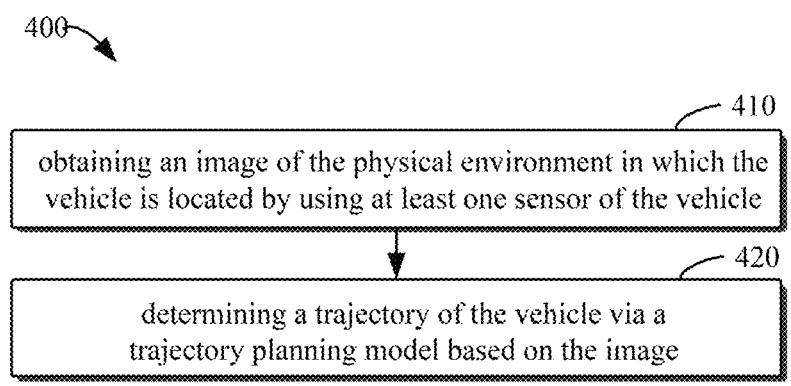
FIG. 4 illustrates a flow chart of a process for determining a trajectory of a vehicle according to some embodiments of the present disclosure.

FIG. 4 illustrates a flow chart of a process for determining a trajectory of the vehicle according to some embodiments of the present disclosure. At block 410, the computing device 102 obtains the image 110 of the physical environment in which the vehicle is located by using at least one sensor 105 of the vehicle 104, and then determines a trajectory of the vehicle 104 by the trajectory planning model 103 based on the image 110, where the trajectory planning model is trained according to the methods 200 and 300 described in FIGS. 2-3.

For example, the trajectory planning model 103 may be a convolutional neural network including an input layer, a convolutional layer, a pooling layer, an activation layer, a fully connected layer, and an output layer. Depending on the specific processing task requirements and configuration, the number of convolutional layer, pooling layer, active layer and fully connected layer, connection relationships, and the like in the trajectory planning model 103 may vary. The images that are captured by the forward wide-angle camera of the vehicle 104 is input to the trajectory planning model 103, and the input data is processed by the intermediate layers of the model 103 to finally obtain a planned trajectory of the vehicle 104.

Figure 5:
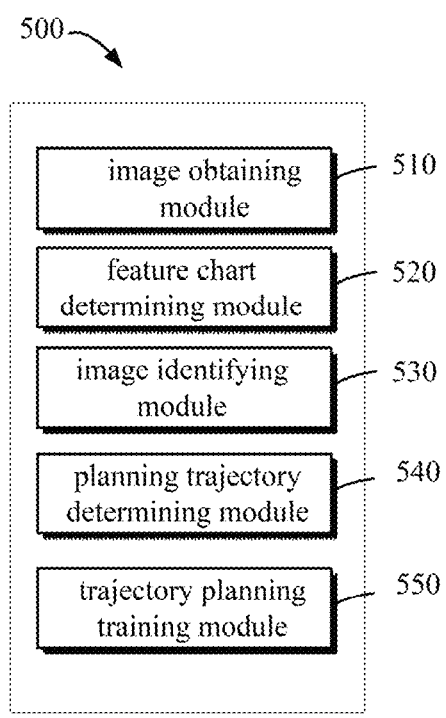
FIG. 5 illustrates a schematic block diagram of an apparatus for a training trajectory planning model according to some embodiments of the present disclosure.

FIG. 5 illustrates a schematic block diagram of an apparatus 500 for training a trajectory planning model according to some embodiments of the present disclosure. The apparatus 500 may be included in or implemented as computing device 102 of FIG. 1.

As shown in FIG. 5, the apparatus 500 includes an image obtaining module 510 configured to obtain an image of a physical environment in which the vehicle is located by using at least one sensor of the vehicle, the image including a plurality of objects surrounding the vehicle. The apparatus 500 further includes a feature chart determining module 520 configured to obtain a feature chart via a trajectory planning model based on the image, the feature chart indicating a plurality of initial trajectory points of the vehicle in the image. The apparatus 500 further includes an image identifying module 530 configured to identify the image to determine a first area in the image associated with a road object in the plurality of objects and a second area in the image associated with a non-road object in the plurality of objects. The apparatus 500 further includes a planning trajectory determining module 540 configured to determine planning trajectory points based on a positional relationship of the plurality of initial trajectory points with respect to the first area and the second area. The apparatus 500 further includes a trajectory planning training module 550 configured to train the trajectory planning model based on the planning trajectory points and actual trajectory points of the vehicle.

In some embodiments, the image identifying module 520 may include: a depth estimation module configured to obtain a depth chart based on a trained depth estimation network, the depth chart indicating a distance of the plurality of objects from the vehicle; and an area determining module configured to determine the first area and the second area based on the distance.

In some embodiments, the planning trajectory determining module 540 may include: a weight determining module configured to determine a corresponding weight of an initial trajectory point of a plurality of initial trajectory points based on a positional relationship; and a trajectory determining module configured to determine a planning trajectory point based on the weight and the feature chart.

In some embodiments, the weight determining module may include a first weight determining module configured to determine that a first set of initial trajectory points has a first weight in response to the first set of initial trajectory points of the plurality of initial trajectory points being within the first area; a second weight determining module configured to determine that a second set of initial trajectory points has a second weight in response to the second set of initial trajectory points of the plurality of initial trajectory points being within the second area; where the first weight is greater than the second weight.

In some embodiments, the first weight may be 1 and the second weight may be 0.4.

In some embodiments, the apparatus 500 may further include a zoom out processing module configured to zoom out the identification chart including the first area and the second area. The zoom out processing module includes: a ratio determining module configured to determine a zoom out ratio based on the identification chart in a first predetermined format and the feature chart in a second predetermined format; and a zoom out executing module configured to zoom out the identification chart in the first predetermined format to the identification chart in the second predetermined format based on the zoom out ratio.

In some embodiments, the non-road object includes a pedestrian, a vehicle, a structure, a plant, or a road sign.

Figure 6:
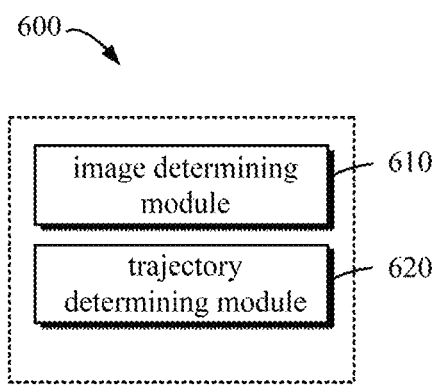
FIG. 6 shows a schematic block diagram of an apparatus for determining a trajectory of a vehicle according to some embodiments of the present disclosure.

FIG. 6 shows a schematic block diagram of an apparatus 600 for determining a trajectory of a vehicle according to some embodiments of the present disclosure. The apparatus 600 may be included in or implemented as computing device 102 of FIG. 1.

As shown in FIG. 6, the apparatus 600 includes an image determining module 610 configured to obtain an image of a physical environment in which the vehicle is located by using at least one sensor of the vehicle; and a trajectory determining module 620 configured to determine a trajectory of the vehicle through the trajectory planning model based on the image, where the trajectory planning model is trained by the apparatus 500 of FIG. 5.

Figure 7:
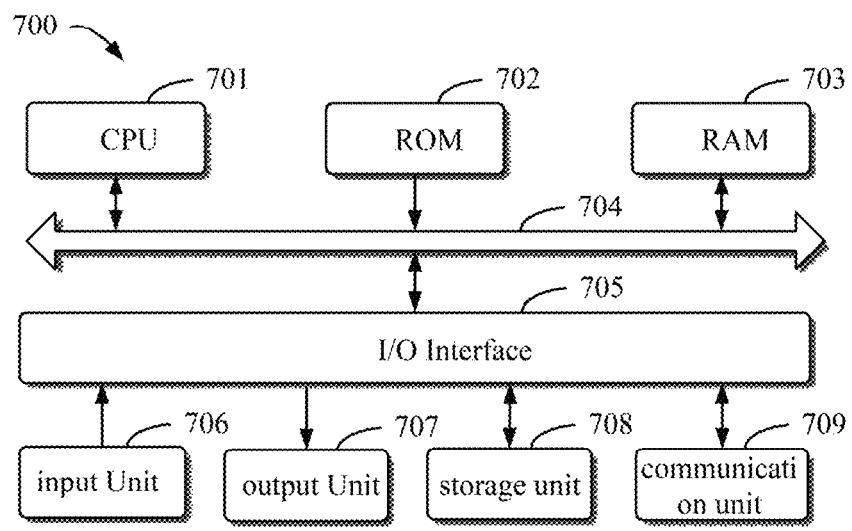
FIG. 7 illustrates a block diagram of a computing device capable of implementing various embodiments of the present disclosure.

FIG. 7 illustrates a schematic block diagram of an example device 700 that may be used to implement embodiments of the present disclosure. For example, the computing device 102 in the example environment 100 shown in FIG. 1 may be implemented by a device 700. As shown, the apparatus 700 includes a central processing unit (CPU) 701, which may perform various appropriate actions and processes according to computer program instructions stored in a Read Only Memory (ROM) 702 or computer program instructions loaded into a Random Access Memory (RAM) 703 from a storage unit 708. In RAM 703, various programs and data required for operation of the device 700 may also be stored. CPU 701, ROM 702, and RAM 703 are connected to each other via a bus 704. An Input/Output (I/O) interface 705 is also connected to bus 704.

A plurality of components in the device 700 are connected to the I/O interface 705, including an input unit 706, such as a keyboard, a mouse, and the like; An output unit 707, for example, various types of displays, speakers, and the like; a storage unit 708, such as a magnetic disk, an optical disk, or the like; and a communication unit 709, such as a network card, a modem, or a wireless communication transceiver. The communication unit 709 allows the device 700 to exchange information/data with other devices over a computer network such as the Internet and/or various telecommunications networks.

The various procedures and processes described in the above, such as methods 200, 300, and 400, may be performed by processing unit 701. For example, in some embodiments, methods 200, 300, and 400 may be implemented as a computer software program tangibly embodied in a machine-readable medium, such as storage unit 708. In some embodiments, some or all of the computer program may be loaded and/or installed on the device 700 via the ROM 702 and/or the communication unit 709. When the computer program is loaded into the RAM 603 and executed by the CPU 601, one or more actions of the methods 200, 300, and 400 described above may be performed.

Some embodiments of the present disclosure may be a method, apparatus, system, and/or computer program product. The computer program product may include a computer readable storage medium having computer readable program instructions embodied thereon for performing various aspects of some embodiments of the present disclosure.

The computer-readable storage medium may be a tangible device that may hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive lists) of the computer-readable storage medium include: a portable computer disk, a hard disk, a Random Access Memory (RAM), a Read Only Memory (ROM), an Erasable Programmable Read Only Memory (EPROM or flash memory), a Static Random Access Memory (SRAM), a portable Compact Disk Read Only Memory (CD-ROM), a Digital Versatile Disk (DVD), a memory stick, a floppy disk, a mechanical encoding device, e.g., a punch card or in-groove bump structure on which instructions are stored, and any suitable combination of the foregoing. As used herein, a computer-readable storage medium is not to be construed as an instantaneous signal itself, such as a radio wave or other freely propagating electromagnetic wave, an electromagnetic wave propagating through a waveguide or other transmission medium (e.g., an optical pulse through a fiber optic cable), or an electrical signal transmitted through a wire.

The computer readable program instructions described herein may be downloaded from a computer readable storage medium to various computing/processing devices, or via a network, such as the Internet, a local area network, a wide area network, and/or a wireless network, to an external computer or external storage device. The network may include copper transmission cables, fiber optic transmission, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in the respective computing/processing device.

The computer program instructions used to perform the operations of some embodiments of the present disclosure may be assembly instructions, Instruction Set Architecture (ISA) instructions, machine instructions, machine-related instructions, microcode, firmware instructions, state setting data, or source or object code written in any combination of one or more programming languages, including object-oriented programming languages such as Smalltalk, C++, and the like, and conventional procedural programming languages such as "C" language and similar coding language. The computer readable program instructions may be executed entirely on the user computer, partly on the user computer, as a separate software package, partly on the user computer and partly on the remote computer, or entirely on the remote computer or server. In the case of a remote computer, the remote computer may be connected to the user computer through any kind of network, including a Local Area Network (LAN) or a Wide Area Network (WAN), or may be connected to an external computer (e.g., connected through the Internet using an Internet service provider). In some embodiments, electronic circuits, such as programmable logic circuits, Field Programmable Gate Arrays (FPGAs), or Programmable Logic Arrays (PLAs), can be personalized with the status information of the computer-readable program instructions, which can execute the computer-readable program instructions to implement various aspects of the present disclosure.

Various aspects of the present disclosure are described herein with reference to flow charts and/or block diagrams of methods, apparatus (systems), and computer program products in accordance with embodiments of the present disclosure. It should be understood that each block of the flowcharts and/or block diagrams, and combinations of blocks in the flowcharts and/or block diagrams, may be implemented by computer readable program instructions.

The computer readable program instructions may be provided to a processing unit of a general purpose computer, special purpose computer, or other programmable data processing apparatus to produce a machine such that the instructions, when executed by the processing unit of the computer or other programmable data processing apparatus, produce means for implementing the functions/actions specified in one or more blocks of the flowchart and/or block diagram. The computer-readable program instructions may also be stored in a computer-readable storage medium that cause a computer, programmable data processing apparatus, and/or other device to operate in a particular manner, such that the computer-readable medium having the instructions stored thereon includes an article of manufacture that includes instructions that implement various aspects of the functions/actions specified in one or more blocks of the flowchart and/or block diagram.

Computer readable program instructions may also be loaded onto a computer, other programmable data processing apparatus, or other device such that a series of operational steps are performed on the computer, other programmable data processing apparatus, or other device to produce a computer-implemented process such that the instructions that execute on the computer, other programmable data processing apparatus, or other device implement the functions/actions specified in one or more blocks of the flowcharts and/or block diagrams.

The flowcharts and block diagrams in the drawings illustrate architectures, functions, and operations of possible implementations of systems, methods, and computer program products in accordance with various embodiments of the present disclosure. In this regard, each block in a flowchart or block diagram may represent a module, program segment, or portion of an instruction that contains one or more executable instructions for implementing a specified logical function. In some alternative implementations, the functions noted in the blocks may also occur in an order different from that noted in the drawings. For example, two successive blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or actions, or may be implemented with a combination of dedicated hardware and computer instructions.

Having described various embodiments of the present disclosure, the foregoing description is an example, not exhaustive, and is not limited to the various embodiments disclosed. Many modifications and variations will be apparent to those of ordinary skill in the art without departing from the scope and spirit of the illustrated embodiments. The choice of terms used herein is intended to best explain the principles of the various embodiments, their practical applications, or improvements to the technology in the market, or to enable others of ordinary skilled in the art to understand the various embodiments disclosed herein.

What is claimed is:

1. A method for training a trajectory planning model, comprising:
    obtaining an image of a physical environment in which a vehicle is located via at least one sensor of the vehicle, wherein the obtained image comprises a plurality of objects surrounding the vehicle;
    obtaining a feature chart from the trajectory planning model based on the image, the feature chart indicating a plurality of initial trajectory points of the vehicle in the image;
    identifying the image to determine in the image a first area associated with a road object in the plurality of objects and a second area associated with a non-road object in the plurality of objects, wherein identifying the image comprises: obtaining a depth image via a trained depth estimation network, wherein each pixel value of the depth image is a distance between a point in the image of the physical environment and the vehicle, and obtaining the first area associated with the road object by multiplying the depth image with a matrix array having a first value corresponding to the first area and a second value corresponding to the second area;
    determining planning trajectory points based on a positional relationship of the plurality of initial trajectory points with respect to the first area and the second area; and
    training the trajectory planning model based on the planning trajectory points and actual trajectory points of the vehicle.

2. The method of claim 1, wherein determining planning trajectory points comprises:
    determining weights for the initial trajectory points based on the positional relationship; and
    determining the planning trajectory points based on the weight and feature chart.

3. The method of claim 2, wherein determining the weights comprises:
    determining that a first set of initial trajectory points of the plurality of initial trajectory points includes a first weight, in response to the first set of initial trajectory points being in the first area; and
    determining a second set of initial trajectory points of the plurality of initial trajectory points includes a second weight, in response to the second set of initial trajectory points being in the second area;
    wherein the first weight is greater than the second weight.

4. The method of claim 3, wherein the first weight is 1 and the second weight is 0.4.

5. The method of claim 1, wherein the method further comprises:
    performing a zoom out process on an identification chart including the first area and the second area, comprising:
    determining a zoom out ratio based on the identification chart in a first predetermined format and the feature chart in a second predetermined format; and
    zooming out the identification chart in the first predetermined format to be the identification chart in the second predetermined format, based on the zoom out ratio.

6. The method of claim 1, wherein the non-road object comprises a pedestrian, a vehicle, a structure, a plant, or a road sign.

7. The method of claim 1, wherein the method further comprises:
    obtaining an image of a physical environment in which the vehicle is located via at least one sensor of the vehicle; and
    determining a trajectory of the vehicle by the trajectory planning model based on the obtained image.

8. The method of claim 1, wherein training the trajectory planning model based on the planning trajectory points and actual trajectory points of the vehicle comprises:
    calculating a cross entropy loss L between the planning trajectory points and the actual trajectory points according to equation (1):

$$L = -\sum_{i=1,2,3 \ldots N} y^{gt}\log y^p + (1 - y^{gt})\log(1 - y^p) \quad (1)$$

wherein i represents a sample, N represents a number of samples, $y^{gt}$ represents the actual trajectory points, and $y^p$ represents the planned trajectory points; and
    performing reverse propagation according to equation (2) to complete a training of the trajectory planning model:

$$\theta = \theta - \gamma \nabla_\theta L(f(\theta), y^{gt}) \quad (2)$$

wherein $\gamma$ represents hyper parametric learning rate, f represents a network structure of the trajectory planning model 103, $\theta$ represents parameters to be learned, $y^{gt}$ represents the actual trajectory points, and L represents a cross entropy loss operation.

9. An electronic device comprising:
one or more processors; and
a storage device for storing one or more programs which, when executed by the one or more processors, cause the one or more processors to perform operations comprising:
obtaining an image of a physical environment in which a vehicle is located via at least one sensor of the vehicle, wherein the obtained image comprises a plurality of objects surrounding the vehicle;
obtaining a feature chart from a trajectory planning model based on the image, the feature chart indicating a plurality of initial trajectory points of the vehicle in the image;
identifying the image to determine in the image a first area associated with a road object in the plurality of objects and a second area associated with a non-road object in the plurality of objects, wherein identifying the image comprises: obtaining a depth image via a trained depth estimation network, wherein each pixel value of the depth image is a distance between a point in the image of the physical environment and the vehicle, and obtaining the first area associated with the road object by multiplying the depth image with a matrix array having a first value corresponding to the first area and a second value corresponding to the second area;
determining planning trajectory points based on a positional relationship of the plurality of initial trajectory points with respect to the first area and the second area; and
training the trajectory planning model based on the planning trajectory points and actual trajectory points of the vehicle.

10. The electronic device of claim 9, wherein determining planning trajectory points comprises:
determining weights for the initial trajectory points based on the positional relationship; and
determining the planning trajectory points based on the weight and feature chart.

11. The electronic device of claim 10, wherein determining the weights comprises:
determining that a first set of initial trajectory points of the plurality of initial trajectory points includes a first weight, in response to the first set of initial trajectory points being in the first area;
determining a second set of initial trajectory points of the plurality of initial trajectory points includes a second weight, in response to the second set of initial trajectory points being in the second area;
wherein the first weight is greater than the second weight.

12. The electronic device of claim 11, wherein the first weight is 1 and the second weight is 0.4.

13. The electronic device of claim 9, wherein the operations further comprise:
performing a zoom out process on an identification chart including the first area and the second area, comprising:
determining a zoom out ratio based on the identification chart in a first predetermined format and the feature chart in a second predetermined format; and
zooming out the identification chart in the first predetermined format to be the identification chart in the second predetermined format, based on the zoom out ratio.

14. The electronic device of claim 9, wherein the non-road object comprises a pedestrian, a vehicle, a structure, a plant, or a road sign.

15. The electronic device of claim 9, wherein the operations further comprise:
obtaining an image of a physical environment in which the vehicle is located via at least one sensor of the vehicle; and
determining a trajectory of the vehicle by the trajectory planning model based on the obtained image.

16. A non-transitory computer readable storage medium having a computer program stored thereon which, when executed by a processor, causes the processor to perform operations comprising:
obtaining an image of a physical environment in which a vehicle is located via at least one sensor of the vehicle, wherein the obtained image comprises a plurality of objects surrounding the vehicle;
obtaining a feature chart from a trajectory planning model based on the image, the feature chart indicating a plurality of initial trajectory points of the vehicle in the image;
identifying the image to determine in the image a first area associated with a road object in the plurality of objects and a second area associated with a non-road object in the plurality of objects, wherein identifying the image comprises: obtaining a depth image via a trained depth estimation network, wherein each pixel value of the depth image is a distance between a point in the image of the physical environment and the vehicle, and obtaining the first area associated with the road object by multiplying the depth image with a matrix array having a first value corresponding to the first area and a second value corresponding to the second area;
determining planning trajectory points based on a positional relationship of the plurality of initial trajectory points with respect to the first area and the second area; and
training the trajectory planning model based on the planning trajectory points and actual trajectory points of the vehicle.

17. The storage medium of claim 16, wherein determining planning trajectory points comprises:
determining weights for the initial trajectory points based on the positional relationship; and
determining the planning trajectory points based on the weight and feature chart.

18. The storage medium of claim 17, wherein determining the weights comprises:
determining that a first set of initial trajectory points of the plurality of initial trajectory points includes a first weight, in response to the first set of initial trajectory points being in the first area; and
determining a second set of initial trajectory points of the plurality of initial trajectory points includes a second weight, in response to the second set of initial trajectory points being in the second area;
wherein the first weight is greater than the second weight.

* * * * *